United States Patent [19]

Nakamoto

[11] Patent Number: 4,848,716

[45] Date of Patent: Jul. 18, 1989

[54] ANTITHEFT DEVICE FOR CAR STEREO

[75] Inventor: Takehiro Nakamoto, Higashihiroshima, Japan

[73] Assignee: Sharp Kabushiki Kaisha, Osaka, Japan

[21] Appl. No.: 225,290

[22] Filed: Jul. 28, 1988

[30] Foreign Application Priority Data

Jul. 29, 1987 [JP] Japan .................. 117456[U]

[51] Int. Cl.⁴ ............................................. F16M 13/00
[52] U.S. Cl. .................... 248/553; 248/27.3; 248/309.1; 312/7.1; 312/215; 335/220
[58] Field of Search ............ 248/551, 553, 27.1; 340/825.31, 64, 63; 180/287

[56] References Cited

U.S. PATENT DOCUMENTS 4,582,290  4/1986  Baron .................................. 248/551
4,687,172  8/1987  Stillbäck ............................. 248/551
4,720,700  1/1988  Seibold et al. ................. 340/825.31

Primary Examiner—Ramon O. Ramirez
Attorney, Agent, or Firm—Birch, Stewart, Kolasch & Birch

[57] ABSTRACT

An antitheft device for a car stereo mounted in the dashboard of a motor vehicle having bores extending through the front panel of its cabinet, the device comprising (i) release pins insertable through the respective bores, (ii) a latch plate movably attached to a side face of the cabinet to engage with a portion of the dashboard and disengageable therefrom be being moved by contact with the release pins when the release pins are inserted through the respective bores to thereby render the car stereo removable from the dashboard, (iii) a blocking plate for openably blocking a space between the latch plate and the bores, (iv) electromagnet form opening the blocking plate with an electromagnetic force, and (v) control circuit for controlling the operation of the electromagnet to hold the circuit out of operation at least while the engine key of the motor vehicle is not turned to "ON" position.

8 Claims, 4 Drawing Sheets

ANTITHEFT DEVICE FOR CAR STEREO

FIELD OF THE INVENTION

The present invention relates to an antitheft device for a car stereo which is removably mounted on the dashboard of passenger motor vehicles.

RELATED ART STATEMENT

FIGS. 4, 7 (a) and 7 (b) show a known antitheft device adapted to removably attach a car stereo to the dashboard of a motor vehicle. The cabinet front panel 1 of the car stereo is formed in each of its opposite ends at upper and lower positions, with bores 2 for inserting therethrough a release pin for removing the cabinet from the dashboard. Beyond the bores 2 inwardly of the front panel, each side plate 3 of the cabinet has a cutout 5. A latch plate 6 has two tongue pieces 7 each having bent latches 7',7' at the respective side edges thereof. The latch plate 6 is attached at its inner end to the outer side of the side plate 3 so as to be movable at its front end portion which is in register with the cutout 5. The dashboard 8 has side walls 10 along which the cabinet is inserted in and each of which is formed with a cutout 9 as opposed to the tongue pieces 7, 7. The latches 7', 7' are engaged with the inner front edge of the side wall 10 defining the cutout 9, whereby the cabinet is prevented from being easily removed from the dashboard 8.

To remove the stereo cabinet from the dashboard 8, release pins 18 are inserted into the bores 2 extending through the front panel 1 at the same time from the front. When the forward end of each pin 18 comes into contact with a bent portion 4 at the front end of the tongue piece 7 and further advances inward, the pin 18 pushes the tongue piece 7 in the direction of an arrow shown in FIG. 7 (b) out of engagement with the cutout defining edge of the side wall 10, whereby the cabinet is released from the dashboard and made withdrawable. Thus, the cabinet is made unremovable unless the release pins 18 are inserted through the bores 2 and is thereby protected from theft. The publication of West German Patent No. DE2903176C2 discloses a similar device.

With the conventional device, however, the stereo cabinet is easily releasable with the release pins 18, or with similar pins if the pins are insertable through the bores 2 even when not accurately sized as specified. Accordingly the device still remains to be improved in antitheft effect.

SUMMARY OF THE INVENTION

The present invention provides an antitheft device for a car stereo mounted in the dashboard of a motor vehicle having bores extending through the front panel of its cabinet, comprising release pins insertable through the respective bores, a latch plate movably attached to a side face of the cabinet to engage with a portion of the dashboard and disengageable therefrom by being moved by contact with the release pins when the release pins are inserted through the respective bores to thereby render the car stereo removable from the dashboard, a blocking plate for openably blocking a space between the latch plate and the bores, electromagnetic means for opening the blocking plate with an electromagnetic force, and control means for controlling the operation of the electromagnetic means to hold the means out of operation at least while the engine key of the motor vehicle is not turned to the "ON" position.

Thus, according to the invention, the space between the latch plate and the bores is blocked with the blocking plate, which is not openable or removable from the space at least while the engine key of the motor vehicle is not turned to "ON" position, whereby the car stereo is prevented from being removed from the dashboard merely by inserting the release pins through the bores.

According to the present invention, the expression that the engine key of the motor vehicle is turned to "ON" position means that the engine of the motor vehicle is turned "on," or an "accessory" (such as car stereo or radio) is turned on by rotating the key. Generally, the engine key is inserted into the keyhole, slightly rotated to "accessory" position, further rotated to "ON" position and further rotated to "start" position. In the present invention, these "accessory" and "ON" position are included in the "ON" position to which the engine key is turned.

BRIEF DESCRIPTION OF THE DRAWINGS

FIG. 1 (b) is a view similar to FIG. 1 (a) and showing the same in operation;

FIG. 7 (b) is a similar view showing the same in operation.

DESCRIPTION OF THE PREFERRED EMBODIMENTS

Figure 1:
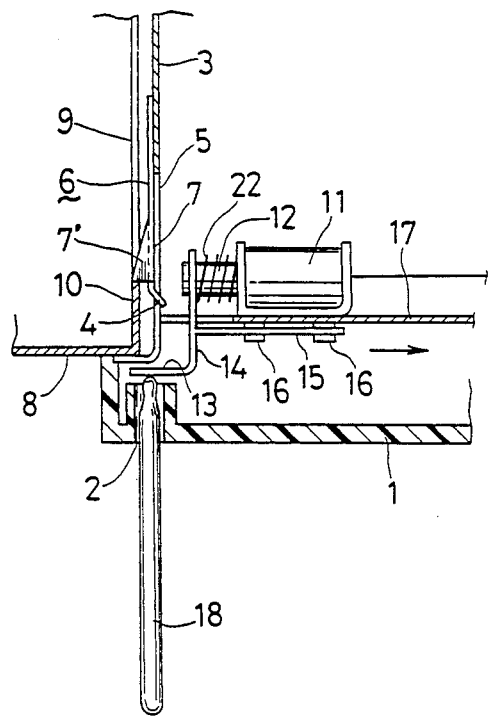
FIG. 1 (a) is a fragmentary plan view in horizontal section showing a device embodying the invention.
Figure 2:
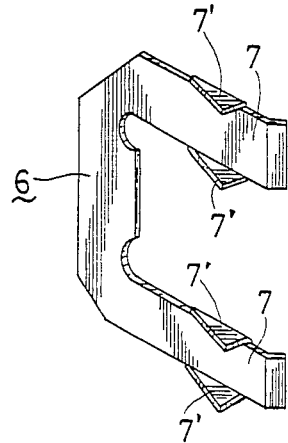
FIG. 2 is a perspective view of a latch plate.
Figure 1:
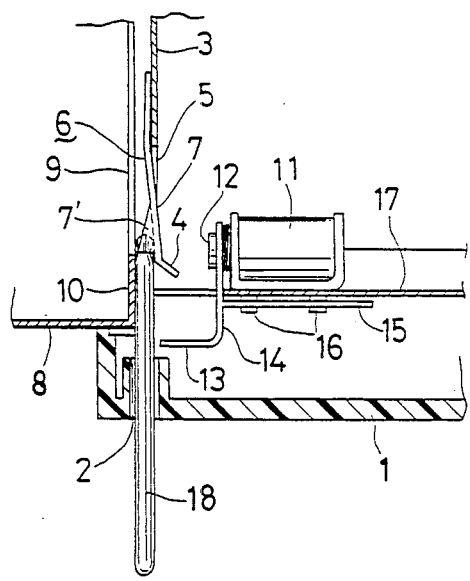

The invention will be described below in detail with reference to the illustrated embodiments. As seen in FIGS. 1 (a) and (b), the cabinet of the illustrated car stereo has a front panel 1 which is formed with bores 2 extending therethrough at upper and lower portions of each end thereof. Beyond the bores inwardly of the front panel, each side plate 3 of the cabinet has a cutout 5. A latch plate 6 is attached at its rear end to the side plate 3 inwardly of the cutout 5 on the outer side of the plate 3. As seen in FIG. 2, the latch plate 6 has two tongue pieces 7, 7 each having latches 7', 7' formed by bending at the respective side edges thereof. Each tongue piece 7 has a front end 4 obliquely bent inwardly of the cabinet and slightly extending into the cabinet through the cutout 5. The front portions of the tongues 7, 7 are movable into the cabinet through the cutout 5. An electromagnet 11 serving as electromagnetic means is fixed to a support plate 17 disposed behind the front panel 1 in parallel thereto. The electromagnet 11 comprises a solenoid L (see FIG. 3) and a core 12 inserted in the solenoid and movable axially thereof. A blocking plate 13 comprises a portion in parallel to the front panel 1 and so positionable as to close the bores 2 at the inner ends thereof, and another portion 14 extending from the above portion at a right angle therewith and secured to the forward end of the core 12. A slidable support 15 extending from the portion 14 perpendicular thereto is slidably retained on the support plate 17 by pins 16.

The dashboard 8 has a cavity for accommodating the car stereo. Each side wall 10 defining the cavity and adjacent to the stereo cabinet placed in is formed with a cutout 9 opposed to the latches 7' of the latch plate 6. The latches 7' are engageable with the inner front edge of the side wall 10 defining the cutout 9. Thus, when the cabinet is inserted into the cavity of the dashboard 8, the front ends of the latches 7' of the latch plate 6 come into engagement with the cutout-defining inner front edge of the side wall 10 and are held engaged therewith.

Figure 3:
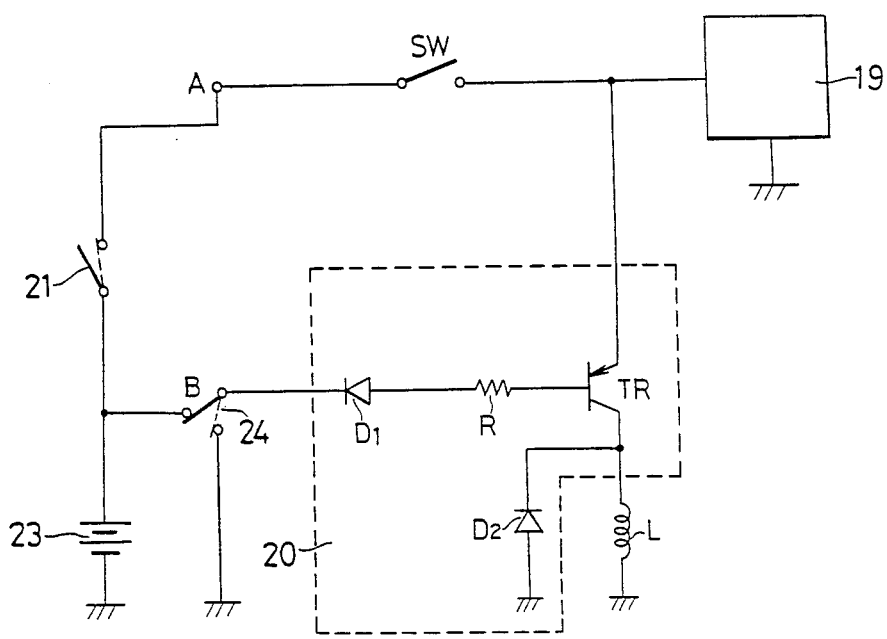
FIG. 3 is a diagram showing a circuit for operating the device.

With reference to FIG. 3 showing an operation circuit for the present embodiment, the operation of the embodiment will be described next. When the driver withdraws the engine key, a first switch 21 is opened. With this movement, the circuit of a terminal A is opened to discontinue the supply of current to the car stereo 19. At the same time, the supply of power to an antitheft circuit 20 is discontinued to deenergize the solenoid L, whereupon the blocking plate 13 is pushed leftward by a spring 22 wound around the core 12 to close the bores at a position close to their inner ends as shown in FIG. 1 (a). The plate 13 prevents insertion of release pins 18 through the bores 2 to prevent the disengagement of the latches 7'. FIG. 3 further shows a battery power supply 23, diodes D1, D2 and a resistor R. The diode D1 is provided to exclude the influence of a great current flowing from the power supply 23 to the engine when the engine is started up.

When the switch SW of the car stereo is closed with the engine key inserted in the keyhole, that is, with the engine key turned to the "accessory" or "ON" position, the voltage at a terminal B is at a high level, consequently elevating the base voltage of a transistor TR included in the antitheft circuit 20 to turn off the transistor TR and hold the selenoid L unenergized. With the electromagnet 11 thus held unenergized, the device is in the same state as when the engine key is removed, i.e. in the state of FIG. 1 (a).

Further when the terminal B is grounded through a second switch 24 with the engine key inserted in the key hole and the car stereo switch SW held closed, the voltage at the terminal B lowers to lower the base voltage, bringing the transistor TR into conduction and passing current through the solenoid L. The electromagnet 11 energized moves the core 12 rightward against the spring 22 to open the bores 2, permitting the insertion of the release pins 18. The forward ends of the pins 18 therefore readily advance in contact with the tongue pieces 7 on the left side thereof by being guided by the bent front ends 4 thereof as seen in FIG. 1 (b), whereby the tongue pieces 7 are forcibly bent rightward. This moves the latches 7' also rightward out of engagement with the front inner edge of the wall 10 defining the cutout 9, rendering the stereo cabinet withdrawable.

Thus, the release pins 18 are insertable only when the terminal B is grounded with the engine key inserted in place and with the stereo switch SW closed.

Theft of the car stereo is completely precluded since the release pins are thus insertable through the bores only when the antitheft circuit is grounded with the engine key inserted in the keyhole and with the car stereo switch turned on.

The present device has the advantage of being very simple in construction and easy and inexpensive to fabricate.

Figure 5:
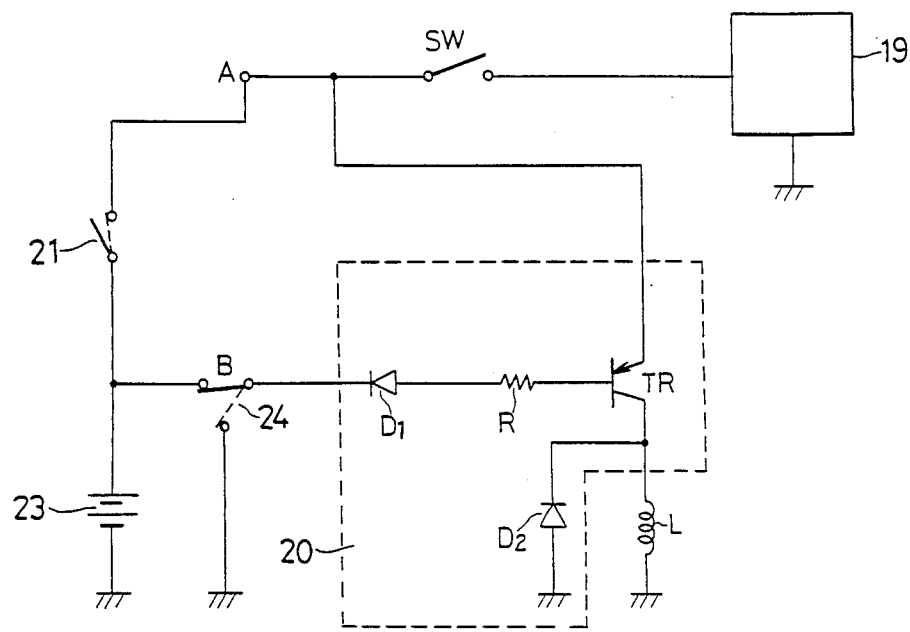
FIG. 5 is a diagram corresponding to FIG. 3 and showing another embodiment.
Figure 6:
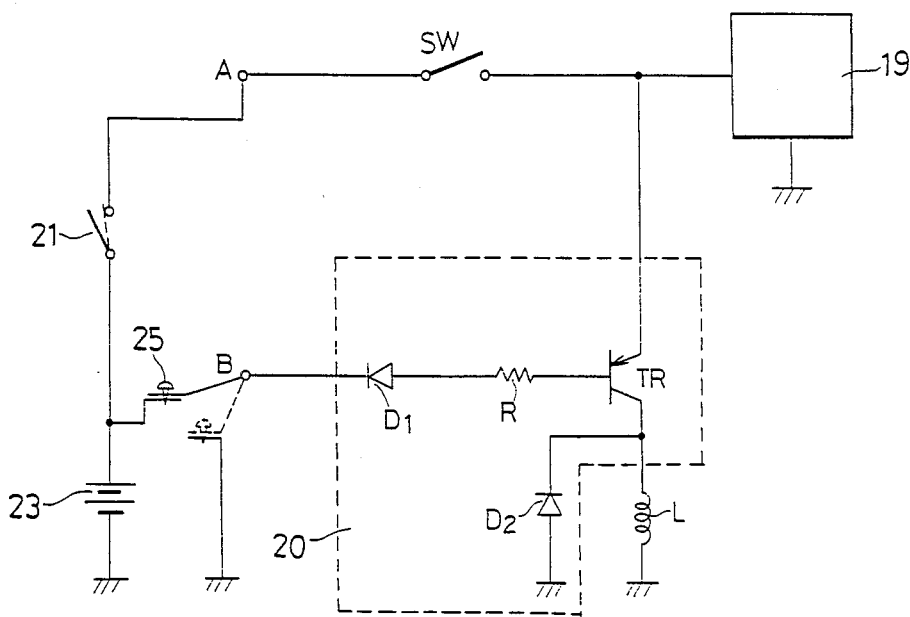
FIG. 6 is a diagram corresponding to FIG. 3 and showing still another embodiment.
Figure 7:
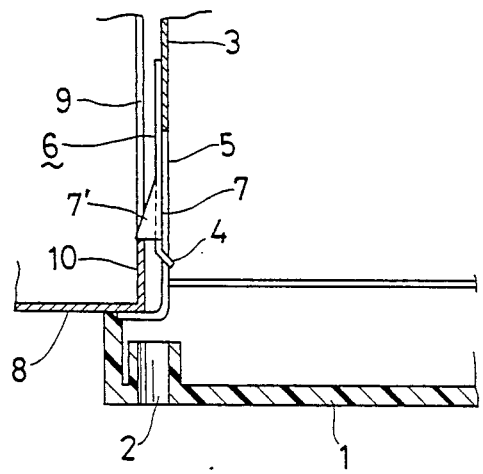
FIG. 7 (a) is a fragmentary plan view in horizontal section of a conventional device.
Figure 7:
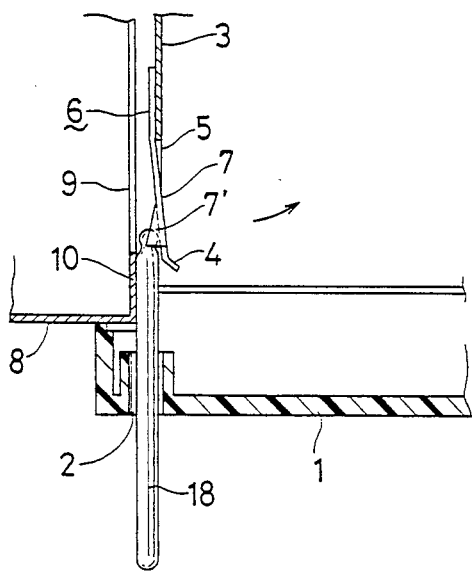

Unlike the foregoing embodiment, the emitter of transistor TR of the antitheft circuit 20 can be connected to the circuit portion between the terminal A and the switch SW as shown in FIG. 5. The release pins are then insertable when the terminal B is grounded through the switch 24, with the engine key inserted in the keyhole.

According to another embodiment, a screw 25 connecting the terminal B to the positive terminal of the battery power supply 23 is removed from the positive terminal side and alternatively fastened to the ground side (body of the motor vehicle) to ground the terminal B as seen in FIG. 5.

Figure 4:
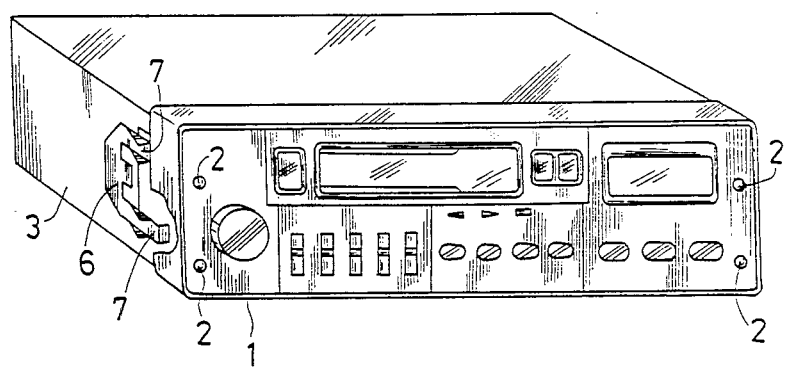
FIG. 4 is a perspective view partly broken away and showing a car stereo generally known.

Usually it is desirable that the switch 24 shown in FIGS. 3 and 4 be installed in a hidden place as a secret switch.

Although not shown, the antitheft circuit 20 and the switch 24 can be omitted from the arrangement of FIG. 3, with the solenoid L connected between the terminal A and the switch SW or between the switch SW and the car stereo body.

Further although not shown, a window may be formed in a blocking plate which is made at least partially of a magnetic material and which is made reciprocatingly movable across the space between the latch plate and the bores by forwardly or reversely passing current through the solenoid.

What is claimed is:

1. An antitheft device for a car stereo mounted in the dashboard of a motor vehicle having bores extending through the front panel of its cabinet, comprising:
 (i) release pins insertable through the respective bores,
 (ii) a latch plate movably attached to a side face of the cabinet to engage with a portion of the dashboard and disengageable therefrom by being moved by contact with the release pins when the release pins are inserted through the respective bores to thereby render the car stereo removable from the dashboard,
 (iii) a blocking plate for openably blocking a space between the latch plate and the bores,
 (iv) electromagnetic means for opening the blocking plate with an electromagnetic force, and
 (v) control means for controlling the operation of the electromagnetic means to hold the means out of operation at least while the engine key of the motor vehicle is not turned to the "ON" position.

2. A device as defined in claim 1 wherein the electromagnetic means comprises a solenoid and a core disposed within the solenoid movably axially thereof and connected to the solenoid for opening the blocking plate when the solenoid is energized, and the control means comprises switch means for controlling the passage of current through the solenoid to hold the solenoid unenergized at least while the engine key of the motor vehicle is not turned to "ON" position.

3. A device as defined in claim 2 wherein the switch means comprises a first switch operatively related to the manipulation of the engine key and closable only when the engine key is turned to the "ON" position, and a power supply switch for the car stereo connected in series with the first switch.

4. A device as defined in claim 2 wherein the switch means comprises a first switch operatively related to the manipulation of the engine key and closable only when the engine key is turned to the "ON" position, a power supply switch for the car stereo connected in series with the first switch, and a transistor switch circuit connected in series with the power supply switch.

5. A device as defined in claim 2 wherein the switch means comprises a first switch operatively related to the manipulation of the engine key and closable only when the engine key is turned to the "ON" position, and a transistor switch circuit connected in series with the first switch.

6. A device as defined in claim 2 wherein the switch means comprises a first switch operatively related to the manipulation of the engine key and closable only when the engine key is turned to the "ON" position.

7. A device as defined in claim 4 wherein the transistor switch circuit comprises a transistor, a resistor and a diode, and the transistor has an emitter connected to the power supply switch, a base adapted to cause the resistor and the diode to selectively ground the battery of the motor vehicle, and a collector connected to the solenoid.

8. A device as defined in claim 7 wherein the transistor switch circuit comprises another diode connected in parallel to the solenoid.

* * * * *